(12) United States Patent
Hackl

(10) Patent No.: US 10,903,664 B2
(45) Date of Patent: Jan. 26, 2021

(54) SMART POWER SUPPLY

(71) Applicant: SAVOX COMMUNICATIONS OY AB (LTD), Espoo (FI)

(72) Inventor: Daniel Patrick Hackl, Vancouver (CA)

(73) Assignee: SAVOX COMMUNICATION OY AB (LTD), Espoo (FI)

( * ) Notice: Subject to any disclaimer, the term of this patent is extended or adjusted under 35 U.S.C. 154(b) by 43 days.

(21) Appl. No.: 16/094,076

(22) PCT Filed: May 4, 2017

(86) PCT No.: PCT/FI2017/050342
§ 371 (c)(1),
(2) Date: Oct. 16, 2018

(87) PCT Pub. No.: WO2017/191368
PCT Pub. Date: Nov. 9, 2017

(65) Prior Publication Data
US 2020/0127468 A1 Apr. 23, 2020

(30) Foreign Application Priority Data
May 4, 2016 (FI) .................................... 20165385

(51) Int. Cl.
*H02J 7/00* (2006.01)
*H02J 7/34* (2006.01)
*H02J 9/06* (2006.01)

(52) U.S. Cl.
CPC .......... *H02J 7/0019* (2013.01); *H02J 7/0024* (2013.01); *H02J 7/00034* (2020.01); *H02J 7/342* (2020.01); *H02J 9/061* (2013.01)

(58) Field of Classification Search
CPC ........ H02J 7/0019; H02J 7/0024; H02J 9/061; H02J 7/342; H02J 7/00034
(Continued)

(56) References Cited

U.S. PATENT DOCUMENTS

| 5,440,221 A | * | 8/1995 | Landau et al. | ........ | H02J 7/0078 |
| | | | | | 320/155 |
| 6,107,802 A | * | 8/2000 | Matthews et al. | .. | H02J 7/00036 |
| | | | | | 324/427 |

(Continued)

FOREIGN PATENT DOCUMENTS

WO  WO 2010/037171  4/2010

OTHER PUBLICATIONS

International Search Report, PCT/FI2017/050342, dated Jul. 18, 2017.
Finnish Search Report, FI 20165385, dated Dec. 2, 2016.

*Primary Examiner* — Sun J Lin
(74) *Attorney, Agent, or Firm* — Nixon & Vanderhye

(57) ABSTRACT

A control device for selectively controlling a power supply from a power source via at least one of a first output and a second output. The control device including at least one processor and at least one memory storing at least one portion of computer program code, the processor being configured to cause the control device to obtain an indication of at least the following parameters: a charge level of the power source, power need from the first output, a power need from the second output; and selectively adjust the power supply via the first output and via the second output from the power source in dependence of the parameters. A power supply arrangement includes the control device.

17 Claims, 4 Drawing Sheets

(58) Field of Classification Search
USPC .......................................................... 320/118
See application file for complete search history.

(56) References Cited

U.S. PATENT DOCUMENTS

| | | |
|---|---|---|
| 6,820,206 B1 | 11/2004 | Kim et al. |
| 2004/0113585 A1 | 6/2004 | Stanesti et al. |
| 2013/0165046 A1 | 6/2013 | Tang et al. |
| 2014/0091623 A1 | 4/2014 | Shippy et al. |
| 2014/0192481 A1 | 7/2014 | Wojcik et al. |

* cited by examiner

SMART POWER SUPPLY

TECHNICAL FIELD

The invention concerns in general the technical field of power supplies. Especially the invention concerns controlling the power supply.

BACKGROUND

In mobile communication an accessory device, such as headphone, speaker, or headset, may be connected to a mobile communication device. Nowadays some of the accessory devices need power in order to operate. All mobile communication devices, such as a mobile phone, are not able to supply power at all or enough power to the accessory device. Thus, the accessory device may comprise a battery to provide and to store the power for the accessory device. Alternatively or in addition, the accessory device may need an auxiliary power source to provide power for the accessory device.

Usually, the accessory device and the mobile communication device have separate chargers. There may exist situations, where a power supply and/or the charger are not available. Thus, an auxiliary power source may be used, when the charge of the mobile communication device or the accessory device becomes low and the device needs to be charged in order to operate. For example, in a demanding professional use, such as rescue, fire-fighting, and police, it is important that the charge level of neither of the mobile communication device and accessory device will not completely empty. Also in that kind of use the charger and/or the power supply may not be available all the time.

According to a prior art solution a power may be supplied to the mobile communication device or accessory device or even both of the devices from a portable external power source. The power source supplies the power to both of the devices, typically according to the need of the power of the devices, until the charge of the power source is empty, if the both devices are connected to the portable external power source at the same time. One drawback of prior art solution is that the operation time of the mobile communication device and the operation time of the accessory device are limited. Typically, the mobile communication device is the weak link limiting the operational time through the limited battery life and the high need of power.

Thus, there is continuous need for improving the operation time of a communication arrangement comprising a mobile communication device and an accessory device.

SUMMARY

An objective of the invention is to present a technique for selectively controlling power supply from a power source via at least one of a first output and a second output. Another objective of the invention is that the technique for controlling power supply improves the operation time of a communication arrangement comprising a mobile communication device and an accessory device.

The objectives of the invention are reached by a control device and a power supply arrangement as defined by the respective independent claims.

According to a first aspect, control device for selectively controlling power supply from a power source via at least one of a first output of the control device and a second output of the control device is provided, wherein the control device comprising: at least one processor; and at least one memory storing at least one portion of computer program code, wherein the processor being configured to cause the control device at least to perform: obtain an indication of at least the following parameters: charge level of the power source, power need from the first output, power need from the second output; and selectively adjust the power supply via the first output of the control device and via the second output of the control device from the power source in dependence of the said parameters.

The power supply may be selectively adjusted in order to supply power via the first output and via the second output substantially equally long time.

According to a second aspect, power supply arrangement is provided, the power supply arrangement comprising a control device as defined above arranged to selectively adjust the power supply from the power source to a first device via the first output of the control device and to a second device via the second output of the control device.

Alternatively or in addition, the second device may comprise a battery to supply power to the second device together with the power source.

The control device may further be configured to obtain an indication of charge level of the battery of the second device and capacity of the battery of the second device.

Additionally, the control device may be configured to selectively adjust the power supply from the power source based on: charge level of the power source at a point of time $t_n$; charge level of the battery of the second device at a point of time $t_n$; power need of the first device over a period of time $\Delta t$; and power need of the second device over the said period of time $\Delta t$, wherein $\Delta t = t_n+1 - t_n$, $n=0, 1, 2 \ldots$, the charge level of the power source at the point of time $t_n+1$ may be the power supplied from the power source over the said period of time $\Delta t$ subtracted from the charge level of the power source at a point of time $t_n$ and the charge level of the battery of the second device at the point of time $t_n+1$ may be the power supplied from the battery of the second device over the said period of time $\Delta t$ subtracted from the charge level of the battery of the second device at a point of time $t_n$.

The first device may comprise an accessory device and the second device may comprise a mobile communication device.

The mobile communication device may be one of the following: mobile phone, radiophone, tablet computer, smartwatch, portable game console, portable radio.

The accessory device of the mobile communication device may be one of the following: headset, microphone, earphone, speaker, inductive loop, speaker microphone.

Alternatively or in addition, the control device may be integrated to the first device.

Alternatively or in addition, the control device may be integrated to the power source.

Alternatively or in addition, the control device and the power source may be integrated to the first device.

The control device may further be configured to control a transfer of data and control signals between the first device and the second device.

The power source may be rechargeable.

According to a third aspect, a control device for selectively controlling power supply from a power source via at least one of a first output of the control device and a second output of the control device is provided, the control device comprising means for selectively supplying power via at least one of the first output of the control device and the second output of the control device, said means arranged to: obtain an indication of at least the following parameters:

available charge level of the power source, power need from the first output, power need from the second output; and selectively adjust the power supply via the first output of the control device and via the second output of the control device from the power source in dependence of the said parameters.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
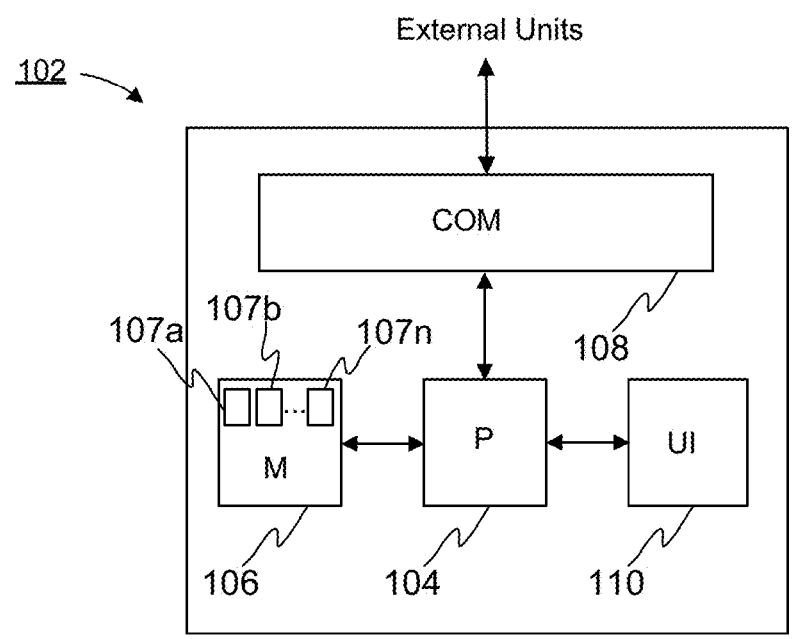
FIG. 1 illustrates schematically a block diagram of a control device according to the invention.

FIG. 1 illustrates a block diagram of some components of a control device according 102 to the invention. The control device may comprise one or more processors 104, one or more memories 106 being volatile or non-volatile for storing portions of computer program code 107$a$-107$n$ and any data values, a communication interface 108 and possibly one or more user interface units 110. The mentioned elements may be communicatively coupled to each other with e.g. an internal bus. The communication interface 108 provides interface for communication with any external unit, such as external power source, mobile communication device, accessory device and/or external systems. The interface for communication with external unit may also be referred to as output of the control device 102. The user interface 110 may comprise hardware components such as a display, a touchscreen and/or an arrangement of one or more keys or buttons, etc.

The processor 104 is arranged to access the memory 106 and retrieve and store any information therefrom and thereto. For sake of clarity, the processor 104 herein refers to any unit suitable for processing information and control the operation of the apparatus, among other tasks. The operations may also be implemented with a microcontroller solution with embedded software. Similarly, the memory is not limited to a certain type of memory only, but any memory type suitable for storing the described pieces of information may be applied in the context of the present invention.

The processor 104 may be arranged to provide a control function for selectively controlling power supply from a power source via at least one of a first output and a second output at least in accordance with a portion of the computer program code 107$a$-107$n$ stored in the memory 106 and possibly further e.g. in accordance with the user input received via the user interface 110. This control function may be also referred to as control means (of the control device 102). In an example, at least part of the control function is provided by a software application that, when executed by the processor 104, causes the control device 102 to control for selectively controlling power supply from a power source 208 via at least one of the first output and the second output.

The processor 104 is configured to cause the control device 102 at least to obtain an indication of at least the following parameters: charge level of the power source, power need from the first output, power need from the second output; and selectively adjust power supply via the first output and via the second output from the power source 208 in dependence of the said parameters. The control device 102 is arranged to supply power to a first device via the first output and supply power to a second device to the second output. The first device may comprise an accessory device 206 and the second device may comprise a mobile communication device 204. A communication arrangement according to the invention may comprise the control device 102, an accessory device 206, and a mobile communication device 204. For sake of clarity, from now on throughout this patent application, the accessory device 206 is used as the first device and the mobile communication device 204 is used as the second device. The first device and the second device may also be some other devices. The second device may comprise a battery to supply power to the second device together with the power source 208.

The mobile communication device 204 may be for example one of the following: mobile phone, radiophone, tablet computer, smartwatch, portable game console, portable radio. The accessory device 206 of the mobile communication device may be for example at least one of the following: headset, microphone, earphone, speaker, inductive loop, speaker microphone. The accessory device 206 may require power supplied from the power source 208 in order to operate. The accessory device may comprise a battery to store and supply power for the accessory device.

Figure 2A:
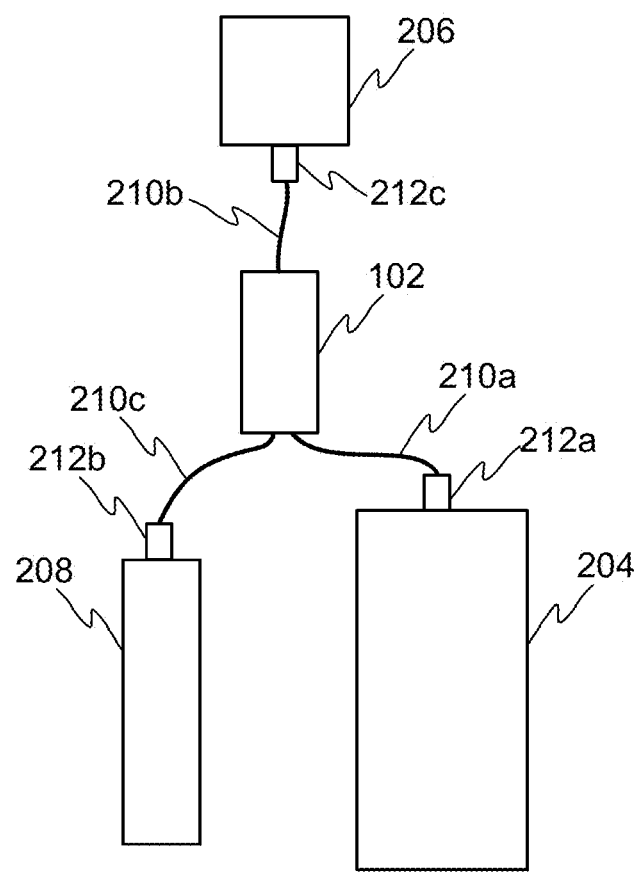
FIG. 2A illustrates schematically an example of an arrangement, wherein the embodiments of the invention may be implemented.

FIG. 2A illustrates schematically an example of a power supply arrangement, wherein the embodiments of the invention may be implemented. The control device 102 according to the invention is connected to a mobile communication device 204, to an accessory device 206, and to a power source 208 via electrical wires 210$a$-210$c$. In FIG. 2A the wire 210$b$ connected to the accessory device 206 is connected from its other end to the first output of the control device 102. Further, the wire 210$a$ connected to the mobile communication device 204 is connected from its other end to the second output of the control device 102.

The control device 102 may be configured to obtain respective indication of charge level and capacity of the power source 208 at a certain point of time. The capacity is defined as the maximum amount of charge a power source, such as a battery, may deliver. The charge level is the available charge capacity of a power source, such as a battery, at a certain point of time. The respective indication of the charge level and the capacity of the power source 208 may be obtained through a data connection between control device 102 and the power source 208. Furthermore, the control device 102 may be configured to obtain also respective indication of charge level and capacity of the battery of the mobile communication device 204 at a certain point of time. The respective indication of the charge level and the capacity may be obtained through a data connection between control device 102 and mobile communication device 204. It is well known that the respective indication of the capacity and the charge level of any mobile communication device or power source may be obtained by connecting the said mobile communication device or said power source to a control unit. Alternatively or in addition, the mobile communication device may comprise an application for providing also the indication of capacity and the charge level of the power source 208. The control device 102 may further be configured to obtain the capacity and the charge level of the power source 208 through the said application.

An average power consumption and charging speed of the mobile communication device 204 may be defined from the obtained capacity and charge level of the battery of the mobile communication device 204 over two sequential points of time. The power need of the mobile communication device 204 may be defined by the average power consumption of the mobile communication device 204. The power consumption of the mobile communication device 204 may be constant. Alternatively, the power consumption of the mobile communication device 204 may be changing.

Alternatively or in addition, an average power consumption of the power source 208 may be defined from the obtained capacity and charge level of the power source over two sequential points of time. The power need of the accessory device 206 may be defined by subtracting the power supplied to the mobile communication device 204 from the power source 208 and charge level of the power source 208 over two sequential points of time. The power consumption of the accessory device 206 may be constant. Alternatively, the power consumption of the accessory device 206 may be changing.

The control device 102 is arranged to supply power from the power source 208 to the accessory device 206 via the first output and to supply power from the power source 208 to the mobile communication device 204 to the second output. The control device 102 is configured to selectively adjust the power supply to the accessory device 206 and to the mobile communication device 204 in dependence of at least the following: available charge level of the power source, power need from the first output, power need from the second output. The power supply is adjusted in order to supply power via the first output and via the second output substantially equally long time. In other words the control device 102 is configured to adjust the power supply to the accessory device 206 and to the mobile communication device 204 so that an operation time of the accessory device 206 and an operation time of the mobile communication device 204 are substantially equally long time. The operation time of the mobile communication device 204 and the operation time of the accessory device 206 may be exactly the same, if the power consumption of the devices is completely constant. The substantially equally long time may be defined so that operation of the both devices stops within the same period of time. The said period of time may be less than 1 hour, for example. Preferably the said period of time may be less than 30 minutes. In other words, the substantially equally long time may defined so that power supplied vie the first output and via the second output stops within the same period of time. The operation time of the accessory device 206 is defined by the time that power is available for the accessory device 206 to operate. The operation time of the mobile communication device 204 is defined by the time that power is available for the mobile communication device 204 to operate. According to an example, if the said period of time is one hour, the operation of the both devices may stop after 7.5 hours. According to another example, if the said period of time is one hour, the operation of the mobile communication device 204 may stop after 7 hours and 15 minutes and the operation of the accessory device 206 may stop after 7 hours and 40 minutes, but the operation times of the both devices are substantially equally long time. According to another example, if the said period of time is 15 minutes, the operation of the mobile communication device 204 may stop after 5 hours and 10 minutes and the operation of the accessory device 206 may stop after 5 hours and 5 minutes, but the operation times of the both devices are substantially equally long time. The above examples are described to clarify the definition of substantially equal long operation time of the devices and thus the advantage of the selectively adjustment of the power supply with the control device 102 according to the invention. These examples do not limit the invention.

The selective adjustment of the power supply from the power source 208 may be based on at least the following: charge level of the power source 208 at a point of time $t_n$, charge level of the battery of the mobile communication device 204 at a point of time $t_n$, power need of the accessory device 206 over a period of time $\Delta t$, power need of the mobile communication device 206 over the said period of time $\Delta t$, wherein $\Delta t = t_{n+1} - t_n$, n=0, 1, 2 . . . . The adjustment of power supply may be provided at points of time $t_n$, wherein n=0, 1, 2 . . . . According to an example the control device 102 may be configured to adjust the power supply from the power source 208 to the accessory device 206 and to the mobile communication device 204 based on the following example definitions. $D_S$ is the power draw from the power source 208 over a period of time $\Delta t$, $N_A$ is the power need of the accessory device 206 over the period of time $\Delta t$, $N_M$ is the power need of the mobile communication device 204 over the period of time $\Delta t$, $C_S$ is the charge level of the power source 208 at the point of time $t_n$, and $C_M$ is the charge level of the battery of the mobile communication device 204 at a point of time $t_n$. $D_M$ is the power draw from the mobile communication device 204 over the period of time $\Delta t$.

$$D_S(\Delta t) = \frac{(N_A(\Delta t) + N_M(\Delta t))C_S(t_n)}{(C_S(t_n) + C_M(t_n))},$$

where $D_S$ is the power draw from the power source 208 over a period of time $\Delta t$, $N_A$ is the power need of the accessory device 206 over the period of time $\Delta t$, $N_M$ is the power need of the mobile communication device 204 over the period of time $\Delta t$, $C_S$ is the charge level of the power source 208 at the point of time $t_n$, and $C_M$ is the charge level of the battery of the mobile communication device 204 at a point of time $t_n$.

Accordingly the power draw from the battery of the mobile communication device 204 to the mobile communication device 204 may be defined based on the following:

$$D_M(\Delta t) = \frac{(N_A(\Delta t) + N_M(\Delta t))C_M(t_n)}{(C_S(t_n) + C_M(t_n))},$$

where $D_M$ is the power draw from the mobile communication device 204 over the period of time $\Delta t$.

Further, the charge level of the power source 208 at the point of time $t_{n+1}$ may be defined by the following definition:

$$C_S(t_{n+1}) = C_S(t_n) - D_S(\Delta t),$$

and accordingly the charge level of the battery of the mobile communication device 204 at the point of time $t_{n+1}$ may be defined by the following definition:

$$C_M(t_{n+1}) = C_M(t_n) - D_M(\Delta t).$$

The period of time may be constant. Alternatively, the period of time may be variable. According to the above described example the power is distributed so that the control device 102 is configured to supply power from the power source 208 to the accessory device 206 according to the power need of the accessory device 206 $N_A$. Additionally, the control device 102 is configured to supply power to the mobile communication device 204 from the battery of the mobile communication device 204 the amount of the defined power draw, $D_M$, from the mobile communication device 204 and from the power source 208, in turn, the amount of the defined power draw, $D_S$, from the power source 208 subtracted by the power configured to be supplied to the accessory device 206, which is the need of the accessory device 206, $N_A$.

According to an embodiment of the invention the accessory device 206 may also comprise a battery to store and supply power for the accessory device 206 together with the power source. Thus, the charge level of the battery of the accessory device 206 may be taken into account in the adjustment of the power supply from the power source 208. The control device 102 may be configured to obtain the respective indication of the charge level and the capacity of the battery of the accessory device 206.

Above is described some examples how the control device 102 may adjust the power supply from the power source 208 to the accessory device 206 and to the mobile communication device 204. These examples do not limit the invention and the inventive idea is applicable in other ways to adjust the power supply.

Figure 2B:
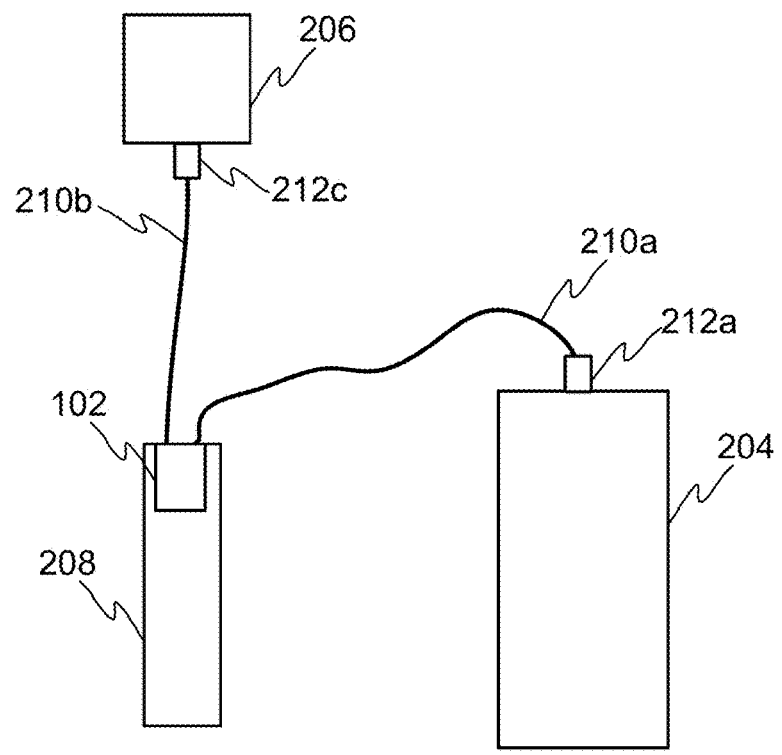
FIG. 2B illustrates schematically another example of an arrangement, wherein the embodiments of the invention may be implemented.
Figure 2C:
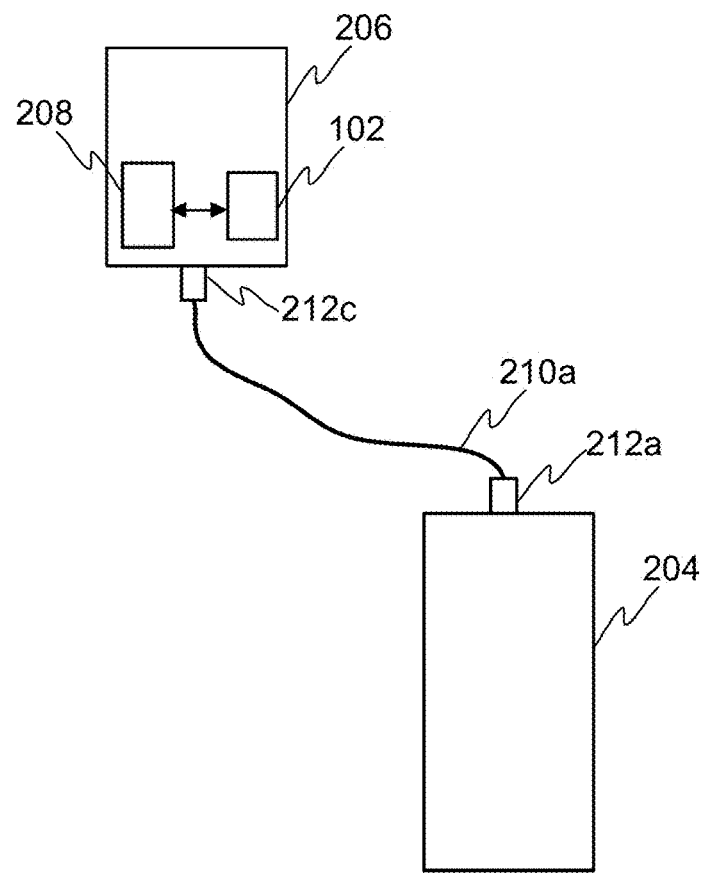
FIG. 2C illustrates schematically another example of an arrangement, wherein the embodiments of the invention may be implemented.

The power source 208 may be an external power source that is connected to the control device 102, as shown in FIG. 2A. Alternatively, the control device 102 may be integrated to the power source 208 as illustrated in FIG. 2B, which illustrates schematically another example of a power supply arrangement, wherein the embodiments of the invention may be implemented. Alternatively, the control device 102 and the power source 208 may both be integrated to the accessory device 206 as illustrated in FIG. 2C, which illustrates schematically another example of an arrangement, wherein the embodiments of the invention may be implemented. The integrated power source 208 may be the battery of the accessory device 206, for example. The power source 208 may be a battery, for example. Alternatively or in addition, the power 208 source may be portable or fixed. Alternatively or in addition, the power source 208 may also be rechargeable. The power source 208 may be charged with a charger connected to the power source via Universal serial bus (USB) connector, dock connector, coaxial power connector.

Connectors 212a-212c for connecting the control device 102 to the mobile communication device 204, accessory device 206, and power source 204 via electrical wires 210a-210c may be for example at least one of the following: any type of Universal serial bus (USB) connector, any type of dock connector, coaxial power connector. Different types of USB connector may be Type-A, Type-B, Type-C, for example. Different types of dock connector may be 30-pin dock connector, Apple Lightning connector, for example. The connectors may be different sizes, for example, mini-USB, micro-USB, 2 mm coaxial power connector, or 3.5 mm coaxial power connector. The connector type does not need to be same for all devices. For example the connector 212a for the mobile communication device 204 may be a dock connector, the connector 212b for power source 208 may be a coaxial power connector, and the connector 212c for the accessory device 206 may be a USB connector. Also other connector combinations are possible. The electric wires 212a-212c may be fixedly connected to the control device 102 as in FIGS. 2A and 2B. Alternatively or in addition, the electric wires 210a-210c may be connected to the control device 102 by means of connectors. The connector type may be for example at least one of the above mentioned connector types. The connector type does not need to be same for all wires 212a-212c. The above discussion about the connectors and wires relates to the power supply. Additionally, for an audio signal from the mobile communication device 204 to the control device and further to the accessory device 206 an additional 3.5 mm audio connector and an audio wire may be used. Alternatively or in addition, the audio signal may be transferred via the same wire and connector as the power, such as micro-USB or Apple Lightening, for example.

Figure 3:
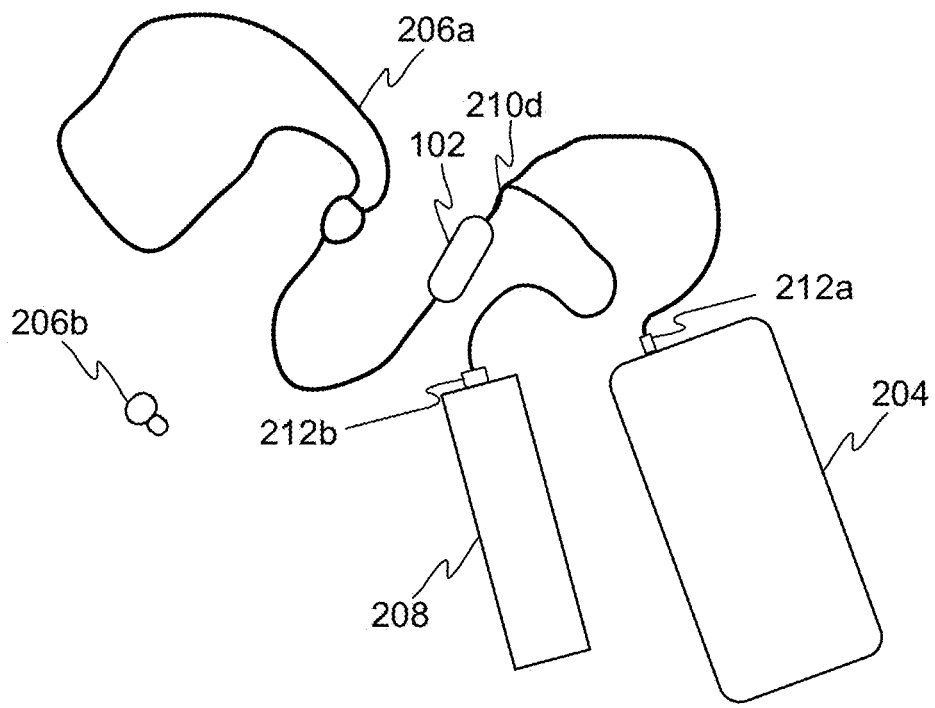
FIG. 3 illustrates schematically another example of an arrangement, wherein the embodiments of the invention may be implemented.

FIG. 3 illustrates schematically still another example of an arrangement, wherein the embodiments of the invention may be implemented. In FIG. 3 the control device 102 is integrated to the accessory device 206. Additionally, the accessory device 206 in FIG. 3 comprises an inductive loop 206a and a wireless earpiece 206b. The signal transfer between the wireless earpiece 206b and the inductive loop is based on wireless short range communication. The inductive loop 206a is an inductive transmitter and the earpiece 206b is a wireless inductive receiver that transforms audio signal through electromagnetic induction. The wireless earpiece 206b requires power in order to operate. Thus, the earpiece 206b may comprise a battery to provide and to store the power for the earpiece 206b. The mobile communication device 204 and the power source 208 may also be connected to the control device 102 through a split wire 210b as shown in FIG. 3. The branch of the split wire connected to the power source 208 transfers power signal from the power source 208 to the control device 102. The branch of the split wire connected to the power source 208 may also transfer data and control signals between the power source 208 and control device 102. The branch of the split wire connected to the mobile communication device 204 transfers power signal from the control device 102 to the mobile communication device 204. Additionally, the branch of the split wire connected to the mobile communication 204 device transfers data and control signals between the control device 102 and the mobile communication device 204.

Figure 4:
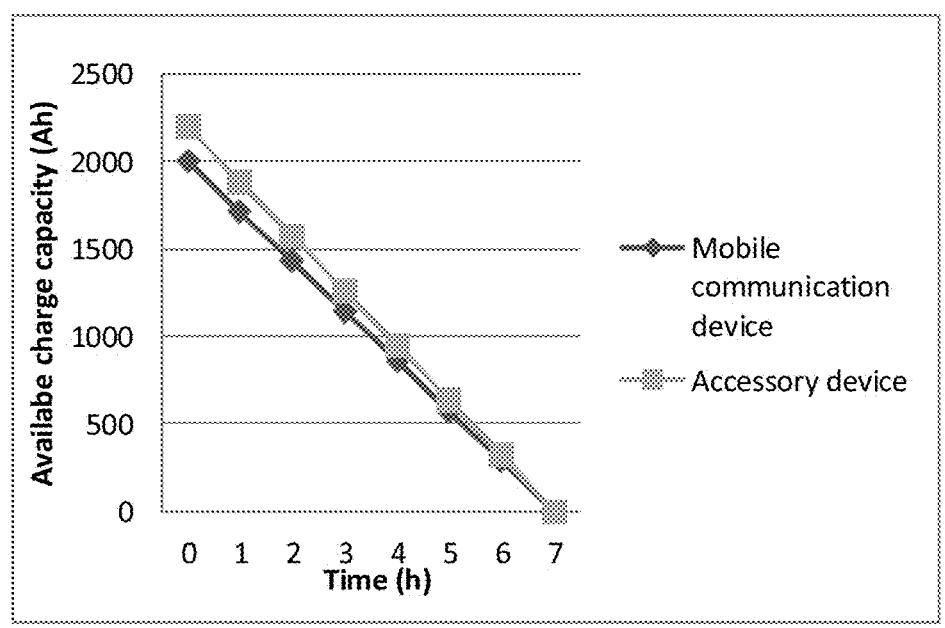
FIG. 4 illustrates schematically an example operation of the power supply arrangement according to the invention.

FIG. 4 illustrates an example operation of the power supply arrangement according to the invention. For the purpose of simplicity the following assumptions are made:

power source 208 is integrated to the accessory device 206,
mobile communication device 204 comprises a battery,
power need of the mobile communication device 204 is constant at every point of time,
power need of the accessory device 206 is constant at every point of time,
period of time Δt is one hour.

It is clear from the context that the above described assumptions are only made for maintaining the simplicity in describing the example of the invention. The above assumptions made do not limit the invention anyhow and the inventive idea is directly applicable in any other implementation according to the invention.

On the x-axis of the FIG. 4 is time and on the y-axis is available charge capacity of a battery. The line with diamonds represents the available charge capacity of the battery of the mobile communication device 204. The line with squares represents the available charge capacity of the power source 208 integrated to the accessory 206. The power supplied to the mobile communication device 204 is supplied from the battery of the mobile communication device 204 together with the power source 208. The power supplied to the accessory device 206 is supplied from the power source 208. The power supply from the power source 208 to the accessory device 206 and to the mobile communication device 204 may be adjusted at every point of time $t_n$ as described above. Consequently, the power supplied from the battery of the mobile communication device 204 to the mobile communication device 204 depends on the amount of power supplied from the power source 208 to the mobile communication device 204, so that the total power supplied to the mobile communication device 204 corresponds to the power need of the mobile communication device 204. The total power supplied to the mobile communication device 204 is the sum of the power supplied from the battery of the mobile communication device 204 and the power supplied from the power source 208. FIG. 4 shows that the power supply from the power source to the mobile communication device and to the accessory device is adjusted so that the operation time of the both devices (mobile communication device and accessory device) is equal. In the other words power supply arrangement according to the invention stops the operation after 7 hours, because battery of the mobile communication device and the power source 208 run empty at the same time.

Figure 5:
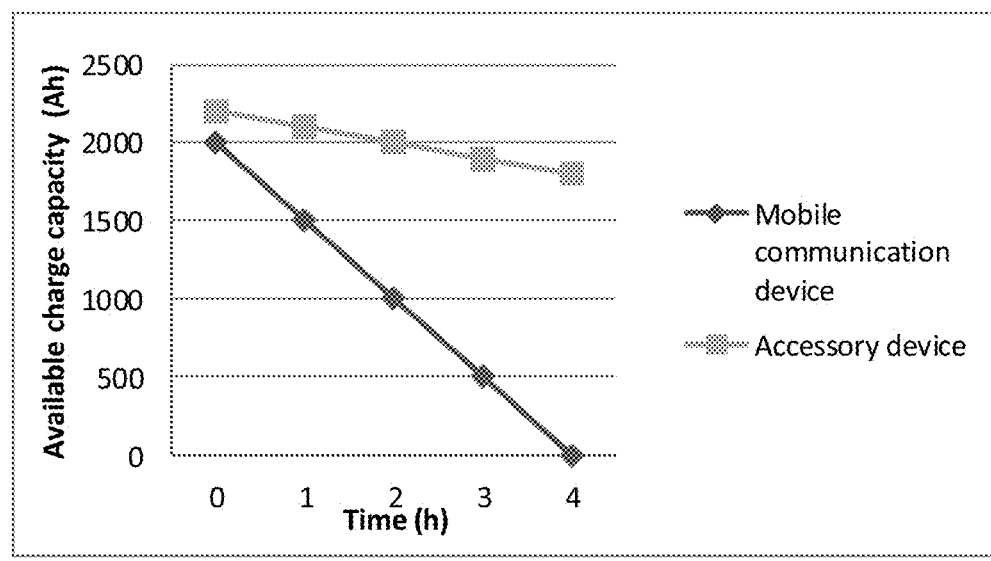
FIG. 5 illustrates schematically an example operation of the power supply arrangement according to prior art.

FIG. 5 illustrates an example operation of the power supply arrangement according to prior art for a comparison. On the x-axis of the FIG. 5 is time and on the y-axis is available charge capacity of a battery. The line with diamonds represents the available charge capacity of the battery of the mobile communication device 204. The line with squares represents the available charge capacity of the power source 208 integrated to the accessory 206. The arrangement is otherwise similar as in the example presented above, but the arrangement does not comprise the control device 102. Also the same assumptions are made as in the context of FIG. 4. The power supplied to the mobile communication device 204 is supplied from the battery of the mobile communication device 204 based on the power need of the mobile communication device 204. The power supplied to the accessory device 206 is supplied from the power source 208 based on the power need of the accessory device 206. FIG. 5 shows that the power supply arrangement according to prior art (without the control device 102 according to the invention) stops the operation after 4 hours, because the battery of the mobile communication device 204 runs empty. Hence, the operation time of the power supply arrangement without the control device 102 according to the invention is 3 hours shorter than the operation time of the power supply arrangement with the control device 102 according to the invention.

Alternatively or in addition, the control device 102 is configured to control transfer of data and control signals between the mobile communication device 204 and the accessory device 206.

The present invention as hereby described provides great advantages over the prior art solutions. For example, the present invention optimizes power distribution and improves the operation time of the mobile communication device. The present invention regulates the power supply to the mobile communication device and the power supply to the accessory device in a way that it maximizes the total operation time of the communication arrangement.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A power supply arrangement comprising a control device for selectively controlling a power supply from a power source to a first device via a first output of the control device and to a second device via a second output of the control device, wherein the control device comprising:
    at least one processor, and
    at least one memory storing at least one portion of computer program code,
    wherein the processor being configured to cause the control device at least to:
        obtain an indication of at least the following parameters: a charge level of the power source, a power need from the first output, a power need from the second output, and
        selectively adjust the power supply via the first output of the control device and via the second output of the control device from the power source in dependence of said parameters,
    wherein the power supply is selectively adjusted so that an operation time of the first device and an operation time of the second device are substantially equally long, and
    wherein the operation time of a device is defined by the time that power is available for said device.

2. The power supply arrangement according to claim 1, wherein the second device comprises a battery to supply power to the second device together with the power source.

3. The power supply arrangement according to claim 2, wherein the control device is further configured to obtain an indication of a charge level of the battery of the second device and capacity of the battery of the second device.

4. The power supply arrangement according to claim 3, wherein the control device is configured to selectively adjust the power supply from the power source based on:
    a charge level of the power source at a point of time $t_n$,
    a charge level of the battery of the second device at a point of time $t_n$,
    a power need of the first device over a period of time Δt, and
    a power need of the second device over said period of time Δt,
    wherein $Δt=t_{n+1}-t_n$, n=0, 1, 2 . . . ,
    the charge level of the power source at the point of time $t_{n+1}$ is the power supplied from the power source over said period of time Δt subtracted from the charge level of the power source at a point of time $t_n$, and the charge level of the battery of the second device at the point of time $t_{n+1}$ is the power supplied from the battery of the second device over said period of time Δt subtracted from the charge level of the battery of the second device at a point of time $t_n$.

5. The power supply arrangement according to claim 4, wherein the first device comprises an accessory device and the second device comprises a mobile communication device.

6. The power supply arrangement according to claim 2, wherein the first device comprises an accessory device and the second device comprises a mobile communication device.

7. The power supply arrangement according to claim 3, wherein the first device comprises an accessory device and the second device comprises a mobile communication device.

8. The power supply arrangement according to claim 1, wherein the first device comprises an accessory device and the second device comprises a mobile communication device.

9. The power supply arrangement according to claim 8, wherein the mobile communication device is one of the following: a mobile phone, a radiophone, a tablet computer, a smartwatch, a portable game console, a portable radio.

10. The power supply arrangement according to claim 9, wherein the accessory device is one of the following: a headset, microphone, an earphone, a speaker, an inductive loop, a speaker microphone.

11. The power supply arrangement according to claim 8, wherein the accessory device is one of the following: a headset, a microphone, an earphone, a speaker, an inductive loop, a speaker microphone.

12. The power supply arrangement according to claim 1, wherein the control device is integrated to the first device.

13. The power supply arrangement according to claim 1, wherein the control device is integrated to the power source.

14. The power supply arrangement according to claim 1, wherein the control device and the power source are integrated to the first device.

15. The power supply arrangement according to claim 1, wherein the control device is further configured to control a transfer of data and control signals between the first device and the second device.

16. The power supply arrangement according to claim 1, wherein the power source is rechargeable.

17. A power supply arrangement comprising a control device for selectively controlling power supply from a power source to a first device via a first output of the control device and to a second device via a second output of the control device, the control device comprising:

means for selectively supplying power via at least one of the first output of the control device and the second output of the control device, said means arranged to:

obtain an indication of at least the following parameters: an available charge level of the power source, a power need from the first output, a power need from the second output, and selectively adjust the power supply via the first output of the control device and via the second output of the control device from the power source in dependence of said parameters, wherein the power supply is selectively adjusted so that an operation time of the first device and an operation time of the second device are substantially equally long, and wherein the operation time of a device is defined by the time that power is available for said device.

\* \* \* \* \*